3,288,831
ISOTHIOCYANATO ALKYL CYCLOHEXANE
DERIVATIVES
Andre Cometti, Maisons-Alfort, and Francois Debarre, Antony, France, assignors to Rhone-Poulenc S.A., Paris, France, a French body corporate
No Drawing. Filed July 1, 1963, Ser. No. 292,090
Claims priority, application France, July 6, 1962, 903,216; Jan. 21, 1963, 922,064
6 Claims. (Cl. 260—454)

This invention relates to new cyclohexane derivatives having therapeutic properties, to processes for their preparation and to pharmaceutical compositions containing them.

According to the present invention, there are provided the new cyclohexane derivatives of the general formula:

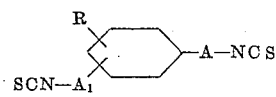
(I)

wherein R represents a hydrogen atom or an alkyl or alkoxy group containing up to 4 carbon atoms, A and $A_1$ are the same or different and each represents a single bond or a straight- or branched-chain alkylene group containing up to 6 carbon atoms, and the group —$A_1$—NCS is in meta- or para-position to the group —A—NCS. The aforesaid cyclohexane derivatives may exist in stereoisomeric forms; the invention includes the stereoisomeric forms and mixtures thereof.

The cyclohexane derivatives of Formula I may be prepared by application of known methods for the preparation of isothiocyanate compounds from corresponding amines or halogen-substituted compounds. According to a feature of the present invention, they are prepared by the process which comprises the reaction of thiophosgene ($CSCl_2$) with a diamino-cyclohexane compound of the general formula:

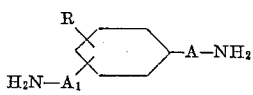
(II)

(wherein the various symbols are as hereinbefore defined, and the group —$A_1$—$NH_2$ is in meta- or para-position to the group —A—$NH_2$) or an acid addition salt thereof. The reaction is carried out using an excess of thiophosgene and at, or close to, ambient temperature, preferably at a temperature between 0° and 30° C. It is advantageous to carry out the reaction in water in the presence of a basic condensing agent capable of neutralising the hydrochloric acid formed during the course of the reaction, for example, calcium carbonate, sodium hydroxide or a tertiary amine such as triethylamine. When an acid addition salt of the diamino-cyclohexane starting material is used, a greater proportion of the condensing agent must be employed in order that part of it will neutralise the acid of the salt.

According to another feature of the invention, the cyclohexane derivatives of Formula I are prepared by the process which comprises the reaction of carbon disulphide and an alkali metal hydroxide or ammonium hydroxide with a diamino-cyclohexane compound of Formula II followed by the decomposition of the resultant dithiocarbamate compound of the general formula:

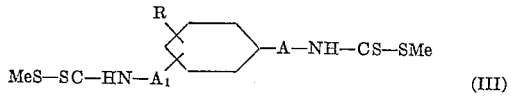
(III)

(wherein Me represents an alkali metal atom or an ammonium ion, R, A and $A_1$ are as hereinbefore defined, and the grouping —$A_1$—NH—CS—SMe is in meta- or para-position to the grouping —A—NH—CS—SMe), preferably by means of ethyl chloroformate, in water at ambient temperature or with gentle heating.

According to a still further feature of the invention, the cyclohexane derivatives of Formula I are prepared by the reaction of an alkali metal thiocyanate (preferably potassium thiocyanate) or ammonium thiocyanate with a dihalogenated compound of the general formula:

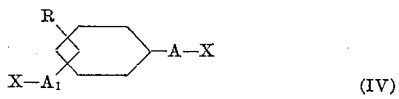
(IV)

wherein X represent a halogen atom, R, A and $A_1$ are as hereinbefore defined, and the substituent —$A_1$—X is in meta- or para-position to the substituent —A—X. The reaction is preferably carried out in water or an inert organic solvent, for example dimethylformamide, with heating to avoid the formation of the corresponding thiocyanate.

The stereoisomeric forms of the cyclohexane derivatives of Formula I may be obtained directly by the above-mentioned processes using starting materials of the corresponding stereoisomeric forms or by separation by methods known per se of mixtures containing them obtained by the processes.

The cyclohexane derivatives of Formula I possess interesting chemotherapeutic properties; they are very active as anthelmintics, particularly against the cestoda, and as fungicides. Preferred compounds are those in which A and $A_1$ both represent single bonds or identical alkylene groups; in particular, 1,4-diisothiocyanatocyclohexane, 1,4 - bis(2-isothiocyanatoethyl)cyclohexane, 1,4 - bis(isothiocyanatomethyl)cyclohexane and 1,3-diisothiocyanatocyclohexane. Of outstanding importance are trans-1,4-bis(2-isothiocyanatoethyl)cyclohexane, and a mixture of the cis and trans forms of 1,4-diisothiocyanatocyclohexane melting at 72° C.

The following examples illustrate the invention.

*Example I*

Thiophosgene (52.0 g.) is added slowly, with stirring, to a suspension of cis-1,4-diaminocyclohexane neutral adipate (60.0 g.) and calcium carbonate (112.0 g.) in water (325 cc.), the temperature being kept between 0 and 10° C. The reaction is allowed to continue, with stirring, for 16 hours at 25° C. Chloroform (400 cc.) is then added, insoluble material filtered off, washed with water (200 cc.), followed by chloroform (100 cc.), and the washings combined with the filtrate. The phases of the liquid mass obtained are separated by decanting and the chloroform solution is dried over sodium sulphate, evaporated under reduced pressure (25 mm. Hg) and the oily residue dissolved in methylene chloride (500 cc.). The solution thus obtained is chromatographed through a column (4 cm. diameter) containing special chromatographic-grade alumina (360 g.). The product retained in the column is eluted with methylene chloride (780 cc.) and the eluate evaporated to dryness under reduced pressure (25 mm. Hg). Recrystallization from diisopropyl ether (50 cc.) gives cis-1,4-diisothiocyanatocyclohexane (13.3 g.), M.P. 60–62° C.

The cis-1,4-diaminocyclohexane starting material is prepared according to A. T. Nielsen, J. Org. Chem., 27, 1998 (1962).

*Example II*

Proceeding as in Example I but commencing with trans-1,4-diaminocyclohexane (16.7 g.), calcium carbonate (44.2 g.) and thiophosgene (35.4 g.), trans-1,4-diisothiocyanatocyclohexane (15.5 g.), M.P. 146° C., is obtained after recrystallization from cyclohexane. The trans-1,4-diaminocyclohexane starting material is prepared according to A. T. Nielsen, J. Org. Chem., 27, 1998 (1962).

Example III

Proceeding as in Example I but commencing with trans-1,4-bis(2-aminoethyl)cyclohexane (115.0 g.), calcium carbonate (148.6 g.) and thiophosgene (176.6 g.), trans-1,4-bis(2-isothiocyanatoethyl)cyclohexane (92 g.), M.P. 52–53° C., is obtained after chromatography and recrystallization from cyclohexane.

The trans-1,4-bis(2-aminoethyl)cyclohexane starting material is prepared according to P. P. Garcia and J. H. Wood, J. Org. Chem., 26, 4167 (1961).

Example IV

Proceeding as in Example I but commencing with cis-1,4-bis(2-aminoethyl)cyclohexane (32.8 g.), calcium carbonate (38.6 g.) and thiophosgene (44.5 g.), cis-1,4-bis(2-isothiocyanatoethyl)cyclohexane (20.0 g.), M.P. 38–39° C., is obtained after chromatography and recrystallization from petroleum ether.

The cis-1,4-bis(2-aminoethyl)cyclohexane starting material is prepared according to P. P. Garcia and J. H. Wood, J. Org. Chem., 26, 4167 (1961).

Example V

Proceeding as in Example I but commencing with cis-1,4-bis(aminomethyl)cyclohexane dihydrochloride (18.7 g.), calcium carbonate (26.1 g.) and thiophosgene (20.9 g.), cis-1,4-bis(isothiocyanatomethyl)cyclohexane (12.7 g.), M.P. 84–86° C., is obtained after chromatography and recrystallization from cyclohexane.

The cis-1,4-bis(aminomethyl)cyclohexane starting material is prepared according to R. Malachowski et coll., Ber., 71, 759 (1938).

Example VI

Proceeding as in Example I but commencing with trans-1,4-bis(aminomethyl)cyclohexane dihydrochloride (32.3 g.), calcium carbonate (45.0 g.) and thiophosgene (47.2 g.), trans-1,4-bis(isothiocyanatomethyl)cyclohexane (9.3 g.), M.P. 107° C., is obtained after chromatography and recrystallization from cyclohexane.

The trans-1,4-bis(aminomethyl)cyclohexane starting material is prepared according to R. Malachowski et coll., Ber., 71, 759 (1938).

Example VII

Proceeding as in Example I but commencing with a mixture of cis- and trans-1,3-diaminocyclohexane (22.8 g.), calcium carbonate (44.0 g.), and thiophosgene (52.2 g.), a mixture of cis- and trans-1,3-diisothiocyanatocyclohexane (14.2 g.), M.P. 48–50° C., is obtained after chromatography and recrystallization from diisopropyl ether.

The 1,3-diaminocyclohexane starting material is prepared according to F. R. Hewgill and P. R. Jefferies, J. Chem. Soc., 805 (1956).

Example VIII

Thiophosgene (48.7 g.) is added slowly to a suspension of 1,4-diaminocyclohexane (mixture of cis- and trans-forms; 20 g.) and calcium carbonate (55.5 g.) in water (70 cc.), the temperature being kept between 0 and 10° C. The reaction is allowed to continue for 16 hours at 25° C. The reaction mixture is then acidified with hydrochloric acid ($d=1.19$; 25 cc.), and then extracted with chloroform (150 cc.). The chloroform extract is evaporated in vacuo and the residue thus obtained is dissolved in methylene chloride (250 cc.). The solution obtained is chromatographed through a column (diameter=3 cm.) containing special chromatographic-grade alumina (200 g.). The product retained in the column is eluted with methylene chloride (565 cc.) and the eluate then evaporated to dryness in vacuo. Recrystallization from cyclohexane (50 cc.), gives 1,4-diisothiocyanatocyclohexane (mixture of cis- and trans-forms; 17 g.), M.P. 72° C.

The present invention further includes within its scope pharmaceutical compositions which comprise as active ingredient, at least one diisothiocyanate of general Formula I in association with a pharmaceutical carrier or coating. The invention includes especially such compositions made up for oral or parenteral administration.

Solid compositions for oral administration include compressed tablets (including enteric coated tablets), pills, dispersible powders, and granules. In such solid compositions one or more of the active compounds is, or are, admixed with at least one inert diluent such as calcium carbonate, potato starch, alginic acid, sucrose or lactose. The compositions may also comprise, as is normal practice additional substances other than inert diluents, e.g., lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and preserving, perfuming, sweetening and flavouring agents. The compositions according to the invention for oral administration also include capsules of absorbable material such as gelatin containing one or more of the active substances with or without the addition of diluents or excipients. Compositions for oral administration, for example 5 grams of active substance with 0.05 gram of lecithin, may also be enclosed in sachets.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired in the species of animal shall be obtained.

We claim:

1. A cyclohexane derivative selected from the class consisting of compounds of the formula:

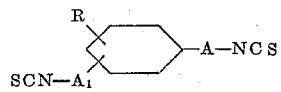

wherein R represents a member of the class consisting of hydrogen, alkyl of up to 4 carbon atoms, and alkoxy of up to 4 carbon atoms, A and $A_1$ represent alkylene groups of up to 6 carbon atoms, and the group

is in one of the meta- and para-positions to the group —A—NCS.

2. A cyclohexane derivative selected from the class consisting of compounds of the formula:

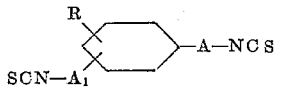

wherein R represents a member of class consisting of hydrogen, alkyl of up to 4 carbon atoms, and alkoxy of up to 4 carbon atoms, A and $A_1$ are the same and represent alkylene groups of up to 6 carbon atoms, and the group —A₁—NCS is in one of the meta- and para-positions to the group —A—NCS.

3. A cyclohexane derivative according to claim 1 wherein R represents a hydrogen atom.
4. 1,4-bis(2-isothiocyanatoethyl)cyclohexane.
5. 1,4-bis(isothiocyanatomethyl)cyclohexane.
6. Trans-1,4-bis(2-isothiocyanatoethyl)cyclohexane.

References Cited by the Examiner
UNITED STATES PATENTS

| | | | |
|---|---|---|---|
| 2,374,136 | 4/1945 | Rothrock | 260—454 X |
| 2,929,794 | 3/1960 | Simon et al. | 260—454 X |

CHARLES B. PARKER, *Primary Examiner.*

D. R. MAHANAND, *Assistant Examiner.*